(12) United States Patent
Finstad et al.

(10) Patent No.: US 7,236,323 B2
(45) Date of Patent: Jun. 26, 2007

(54) METHOD AND APPARATUS FOR PROVIDING COMBINED RADIAL AND TIMING MULTISLOT SELF-SERVOWRITE PROPAGATION

(75) Inventors: Blake O. Finstad, San Juan Bautista, CA (US); Gary A. Herbst, San Jose, CA (US); Kishan K. Kumbia, Morgan Hill, CA (US); Mark D. Schultz, Ossining, NY (US); Scott A. Thomas, San Jose, CA (US); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/930,163

(22) Filed: Aug. 31, 2004

(65) Prior Publication Data
US 2006/0044667 A1 Mar. 2, 2006

(51) Int. Cl.
*G11B 21/02* (2006.01)
*G11B 5/09* (2006.01)

(52) U.S. Cl. .............................. 360/75; 360/51; 360/48
(58) Field of Classification Search ................. 360/75, 360/51, 48
See application file for complete search history.

(56) References Cited

U.S. PATENT DOCUMENTS

| | | |
|---|---|---|
| 2004/0012874 A1 | 1/2004 | Chainer et al. |
| 2004/0085669 A1* | 5/2004 | Cisewski et al. ............. 360/75 |

* cited by examiner

*Primary Examiner*—Fred F. Tzeng
(74) *Attorney, Agent, or Firm*—David W. Lynch; Chambliss, Bahner & Stophel PC

(57) ABSTRACT

A method and apparatus for providing combined radial and timing multislot self-servowrite propagation is disclosed. Radial bursts are combined with each timing mark and requires only three recovery/read-write spacing allocations per sector. The channel operates without requiring the writing of any bursts between reading radial bursts.

22 Claims, 10 Drawing Sheets

METHOD AND APPARATUS FOR PROVIDING COMBINED RADIAL AND TIMING MULTISLOT SELF-SERVOWRITE PROPAGATION

BACKGROUND OF THE INVENTION

1. Field of the Invention

This invention relates in general to storage devices, and more particularly to a method and apparatus for providing combined radial and timing multislot self-servowrite propagation.

2. Description of Related Art

Increased levels of storage capacity in floppy and hard disk drives are a direct result of the higher track densities possible with voice-coil and other types of servo positioners as well as the ability to read and write narrower tracks by using, for example, magnetoresistive (MR) head technology. An embedded servo is needed so that the position of the head can be determined from the signals it reads.

Conventional hard disk manufacturing techniques including writing servo tracks on the media of a head disk assembly (HDA) with a specialized servo writer instrument. Laser positioning feedback is used in such instruments to read the actual physical position of a recording head used to write the servo tracks. Unfortunately, it is becoming more and more difficult for such servo writers to invade the internal environment of a HDA for servo-writing because the HDAs themselves are exceedingly small and depend on their covers and castings to be in place for proper operation. Some HDAs are the size and thickness of a plastic credit card. At such levels of microminiaturization, traditional servo-writing methods are inadequate.

Conventional servo-patterns typically comprise short bursts of a constant frequency signal, very precisely located offset from a data track's centerline, on either side. The bursts are written in a sector header area, and can be used to find the centerline of a track. Staying on center is required during both reading and writing. Since there can be hundreds of sectors per track, that same number of servo data areas must be dispersed around a data track. These servo-data areas allow a head to follow a track center line around a disk, even when the track is out of round, as can occur with spindle wobble, disk slip and/or thermal expansion. As technology advances to provide smaller disk drives, and increased track densities, the placement of servo data must also be proportionately more accurate.

In magnetic disk drives, magnetic heads and recorded servo code in a track following servo mode are used for keeping the magnetic heads track centered during reading operations. The magnetic heads comprise a magnetic core having an air gap therein and having a coil wound thereon. These magnetic cores vary in effective magnetic widths due to their design and due to the manufacturing process. These physical variations among the magnetic heads result in variations in servo gain when they are individually connected in the servo loop.

During the manufacture of a magnetic disk drive it is necessary to provide a magnetic pattern on each surface of each disk that is used by the servo control system for position and timing feedback. This pattern is known as the servo pattern. The process of writing this servo pattern onto each disk is known as servo writing. Typically the servo writing process is done in a clean room environment before the magnetic disk drive is completely sealed. During the servo writing process it is necessary to have very accurate position and timing feedback so that the servo pattern can be properly written across the entire surface of each disk in the magnetic disk drive. The position feedback is typically provided by a positioner that comes in physical contact with the arms, which support the heads on each surface of the magnetic disk drive. The positioner provides the feedback and the ability to move the heads via the arms with sufficient accuracy. The arms are kept in contact with the positioner by applying a constant bias force against the positioner's push-pin.

The timing feedback is provided by writing a pattern circumferentially around the disk with a dedicated head known as a clock head. It is inserted over one of the disks in the magnetic disk drive for this purpose during the servo write process and then removed once the process is complete. The timing feedback has also been provided by writing timing signals with the heads in the magnetic disk drive equally spaced around the circumference of at least one disk. The timing signals, called timing marks, need to be written each time the position of the heads is changed.

There is a lot of interest in the magnetic disk drive business on being able to servo write a magnetic disk drive without any external position or timing feedback to assist in the servo writing process. This is generally referred to as self-servo writing. Self-servo writing allows the servo write process to be moved outside of the clean room after the magnetic disk drive has been sealed. This provides a great cost advantage because clean room space is very expensive. Likewise there has been an interest making this process more affordable by using the same electronics that are used on the finished product. In the product electronics the data channel is the primary source of position and timing feedback.

It can be seen that there is a need for a method and apparatus for simplifying the process of writing of a pattern onto the disk with sufficient accuracy for the servo writing process.

SUMMARY OF THE INVENTION

To overcome the limitations described above, and to overcome other limitations that will become apparent upon reading and understanding the present specification, the present invention discloses a method and apparatus for providing combined radial and timing multislot self-servowrite propagation.

The present invention solves the above-described problems by providing a simple process for writing of a pattern onto the disk with sufficient accuracy for the servo writing process. Radial bursts are combined with each timing mark and requires only three recovery/read-write spacing allocations per sector. The channel operates without requiring the writing of any bursts between reading radial bursts. This process will support heads where the read trails the write and propagations where the offset gets smaller rather than larger and allows for writing a greater number of servo sectors without impacting the precision necessary at higher densities.

A method for providing combined radial and timing multislot self-servowrite propagation for a magnetic disk drive in accordance with the principles of the present invention includes dividing a sector into a plurality of slots and a plurality of subsets of the plurality of slots, writing timing pattern information and radial pattern information within a first subset of the plurality of slots at a plurality of adjacent radial locations, reading at least a portion of said written pattern information at a radial location and using the read of said written patterns to write further timing and radial patterns in a second subset of the plurality of slots.

In another embodiment of the present invention, a magnetic storage system is provided. The magnetic storage system includes at least one magnetic storage medium, a motor for translating the magnetic storage medium, at least one magnetic transducer for reading and writing data on the at least one magnetic storage medium, an actuator, coupled to the at least one magnetic transducer, for moving the at least one magnetic transducer relative to the at least one magnetic storage medium and a read/write channel, coupled to the at least one magnetic transducer, for processing data read and written on the at least one magnetic storage medium, wherein the read/write channel is configured for providing combined radial and timing multislot self-servowrite propagation by dividing a sector into a plurality of slots and a plurality of subsets of the plurality of slots, writing timing pattern information and radial pattern information within a first subset of the plurality of slots at a plurality of adjacent radial locations, reading at least a portion of said written pattern information at a radial location and using the read of said written patterns to write further timing and radial patterns in a second subset of the plurality of slots.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing combined radial and timing multislot self-servowrite propagation. The present invention provides a simple process for writing of a pattern onto the disk with sufficient accuracy for the servo writing process. Radial bursts are combined with each timing mark and requires only three recovery/read-write spacing allocations per sector. The channel operates without requiring the writing of any bursts between reading radial bursts. This process will support heads where the read trails the write and propagations where the offset gets smaller rather than larger and allows for writing a greater number of servo sectors without impacting the precision necessary at higher densities.

Figure 1:
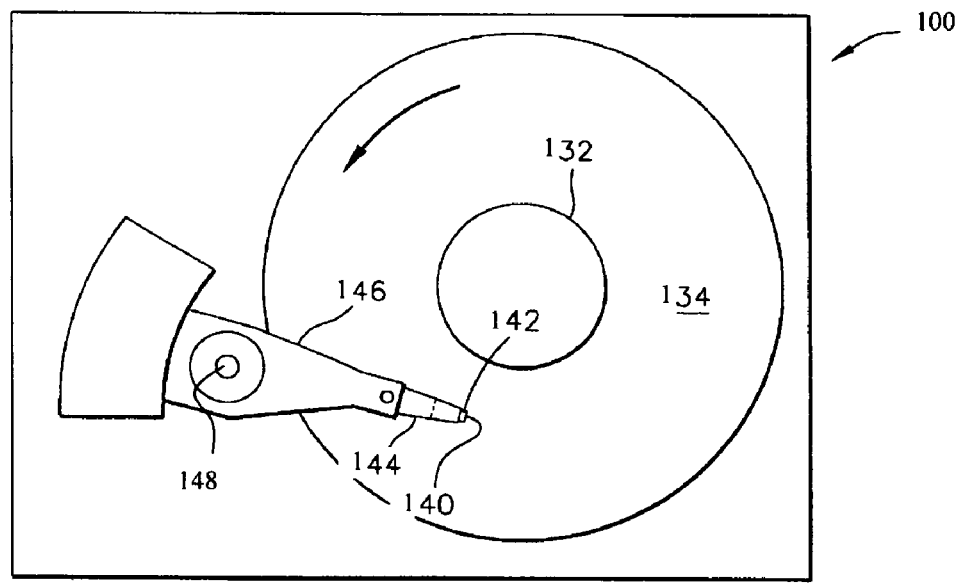
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
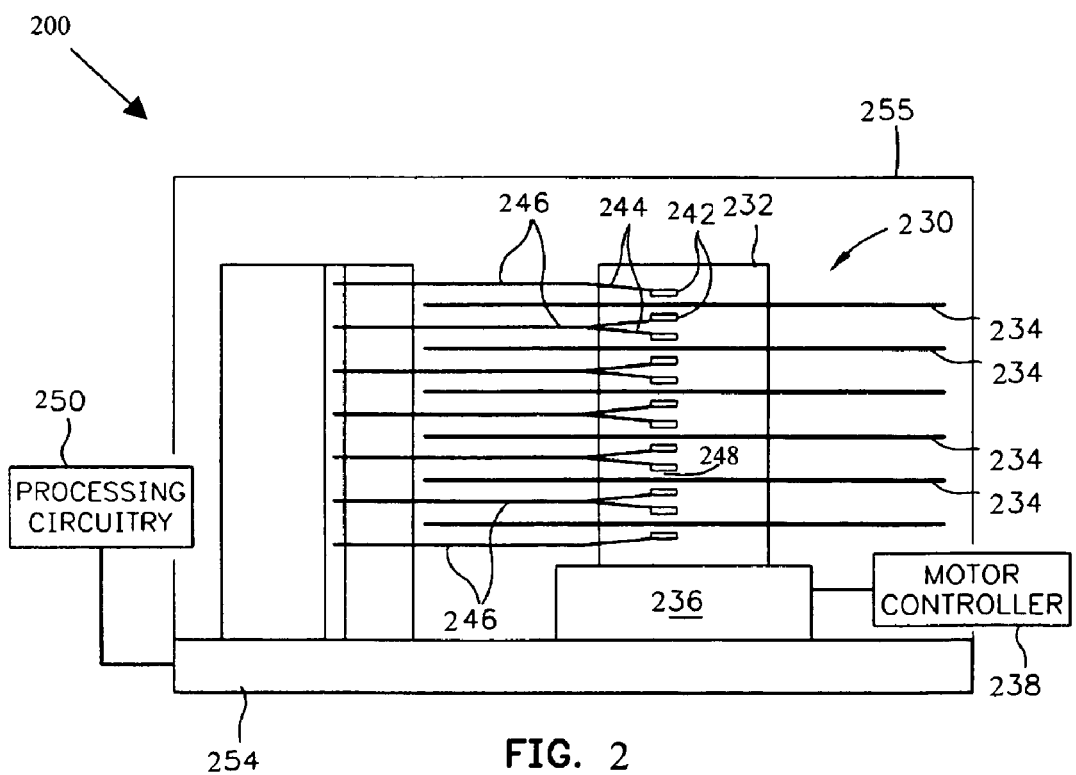
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
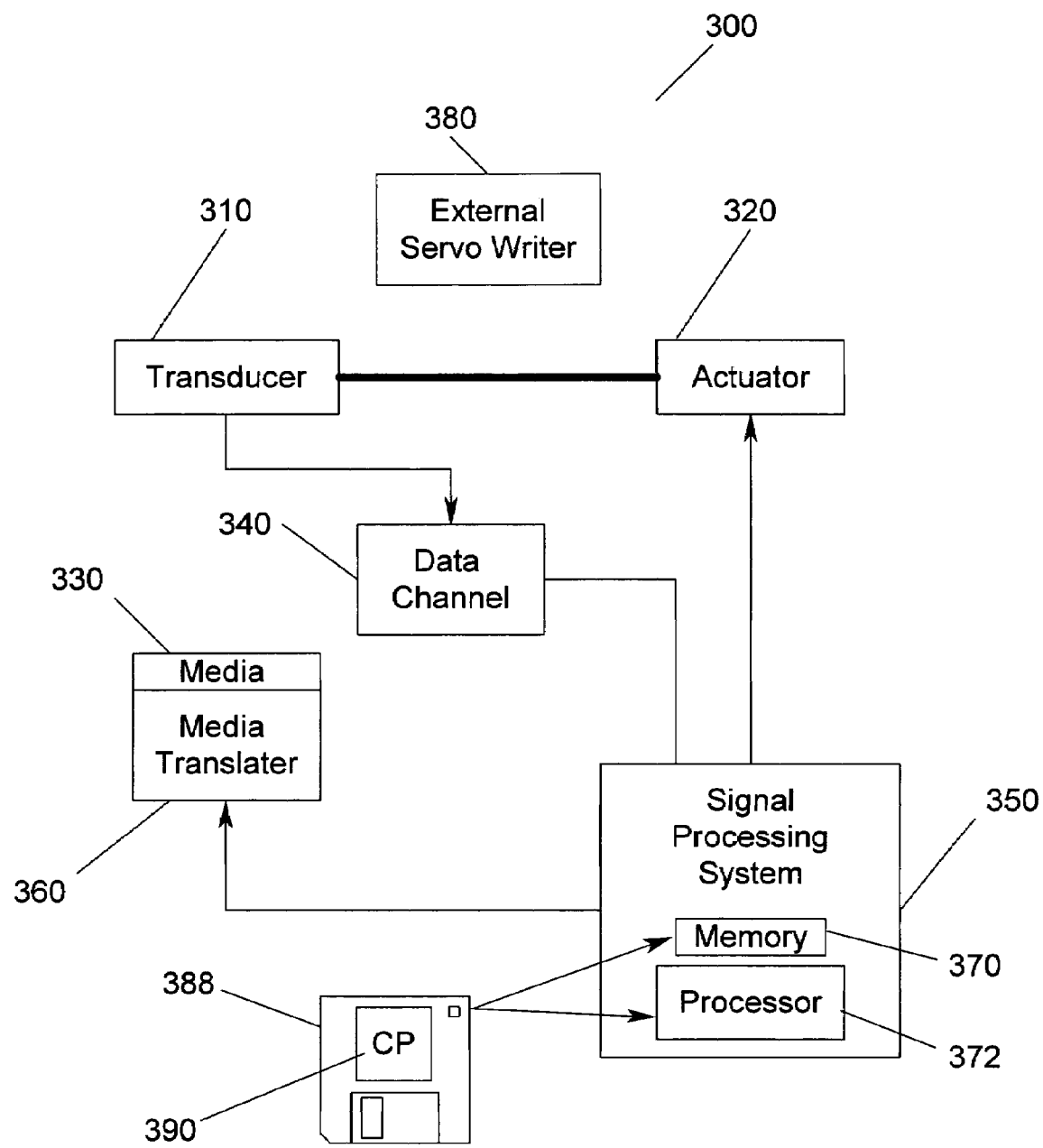
FIG. 3 illustrates a storage system according to the present invention.

FIG. 3 illustrates a storage system 300 that uses an MR sensor for sensing increased resistance changes in an MR element to detect MR sensor events according to an embodiment of the present invention. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

The writing of the combined timing/radial burst pattern according to an embodiment of the present invention may be performed using electronics of the magnetic disk drive, such as the signal processing system 350 and/or data channel 340. Alternatively, the writing of the combined timing/radial burst pattern according to an embodiment of the present invention may be performed using an external servo-writing device 380.

Figure 4:
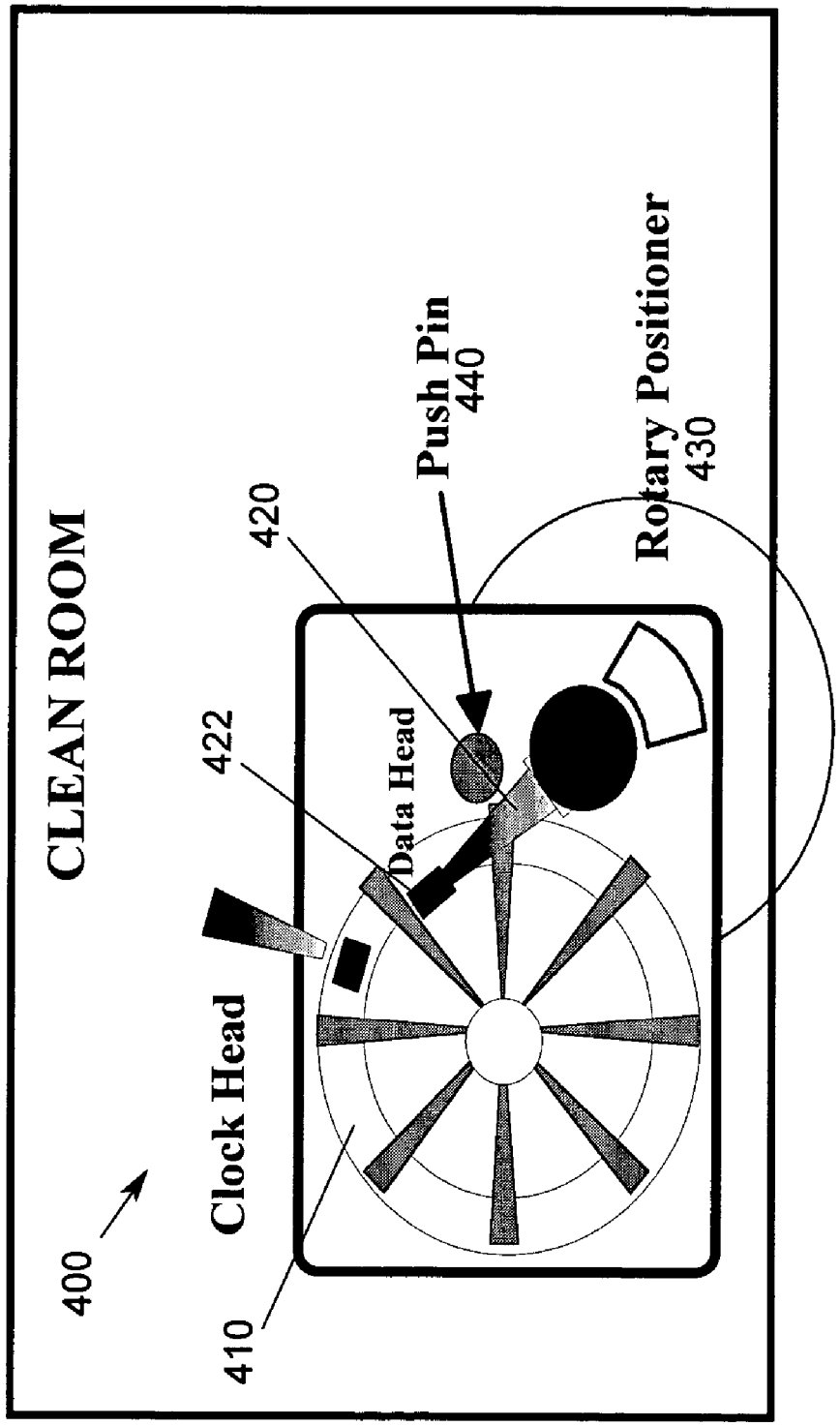
FIG. 4 illustrates a servo writing process in a clean room environment before the magnetic disk drive is completely sealed.

FIG. 4 illustrates a servo writing process in a clean room environment before the magnetic disk drive is completely sealed. In FIG. 4, a magnetic disk drive 400 is shown. The magnetic disk drive 400 includes at least one disk 410, an actuator arm 420 and a data head 422 disposed along tracks on the disk 410. Very accurate position and timing feedback is necessary so that the servo pattern can be properly written across the entire surface of each disk in the magnetic disk drive. A rotary positioner 430 is used to provide the position feedback. The rotary positioner 430 makes physical contact with the arms 420 that support the heads 422 on each surface of the magnetic disk 410. The rotary positioner 430 provides the feedback and the ability to move the heads 422 via the arms 420 with sufficient accuracy. The arms 420 are kept in contact with the positioner by applying a constant bias force against the positioner's pushpin 440.

Figure 5:
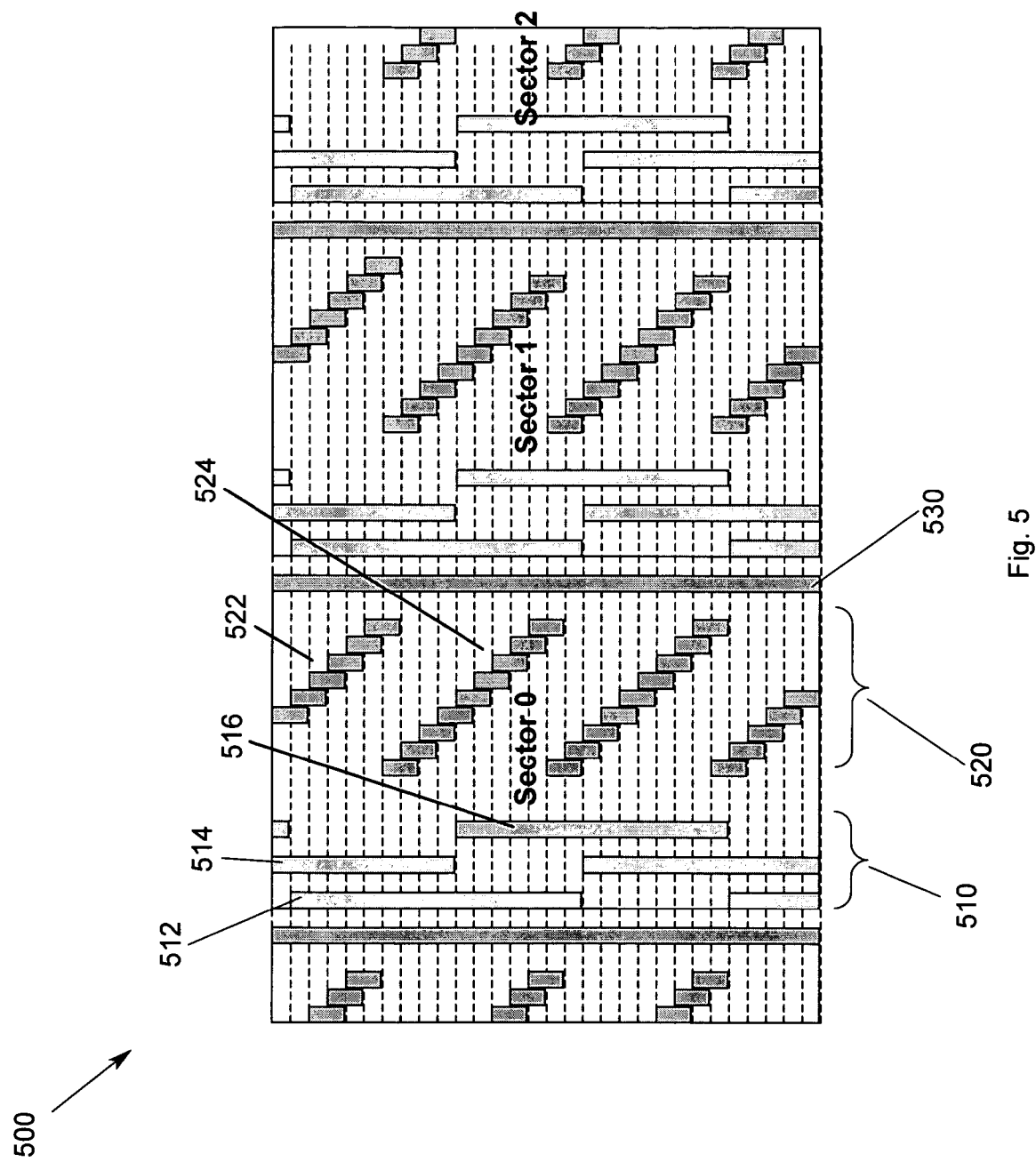
FIG. 5 illustrates typical patterns written during a servo write process.

FIG. 5 illustrates typical patterns 500 written during a servo write process. During the process of self-servo writing there are three basic patterns in each sector that must be written onto the disk. The first pattern 510 is called a timing mark. The timing mark 510 provides the timing or circumferential feedback for the self-servo write process. To use the data channel to detect the timing mark 510 a pattern is written with a sync field followed by a sync mark similar to the way customer data is written. Special circuitry in the data channel has been designed to measure the time interval between consecutive timing marks with an accuracy that is sufficient for very good timing feedback. However, it is not possible to read the entire timing pattern before it is necessary to start writing the timing pattern on another servo track. In other words the length of the timing pattern is longer than the separation between the read and write elements of the heads. To overcome this problem a multislot timing pattern methodology 510 as shown in FIG. 5 was developed. In brief, this technique involves writing the timing pattern in three 'slots' 512, 514, 516 instead of just one. The idea is to always write the timing mark in two of the slots, e.g., 512, 514, while reading the timing mark in the third slot, e.g., 516. The slots 514, 516 are spaced far enough apart to allow for the read-to-write separation and the write-to-read recovery time of the circuitry. An algorithm is used to determine when a slot is read as the head moves from track to track.

The second pattern 520 is the radial burst pattern. The radial burst pattern 520 provides the position or radial feedback for the self-servo write process. The radial burst pattern 520 consists of several 'bursts' 522, 524 written at a single frequency. One burst is written on each servo track. Three of the bursts are actually used on each servo track to provide accurate position feedback. However, to avoid the problem of reading a burst while trying to write the radial burst pattern on another track, there are several radial slots provided. A lot of planning must go into the layout of the radial bursts based on the write-to-read recovery time and the offset of the write and read elements of the head. The timing for the writing and reading of the bursts is updated once per revolution of the disk at the index time. Therefore the bursts are very long to allow for timing error caused by variations in spindle motor speed.

The third pattern 530 is called the product servo pattern. The product servo pattern 530 is the pattern that will ultimately be used by the servo electronics in the magnetic disk drive to provide timing and position feedback. The writing of the servo pattern 530 is the main goal of the servo writing process. Both the timing marks 510 and radial patterns 520 will be overwritten with customer data during the formatting of the magnetic disk drive in subsequent manufacturing processes.

Figure 6:
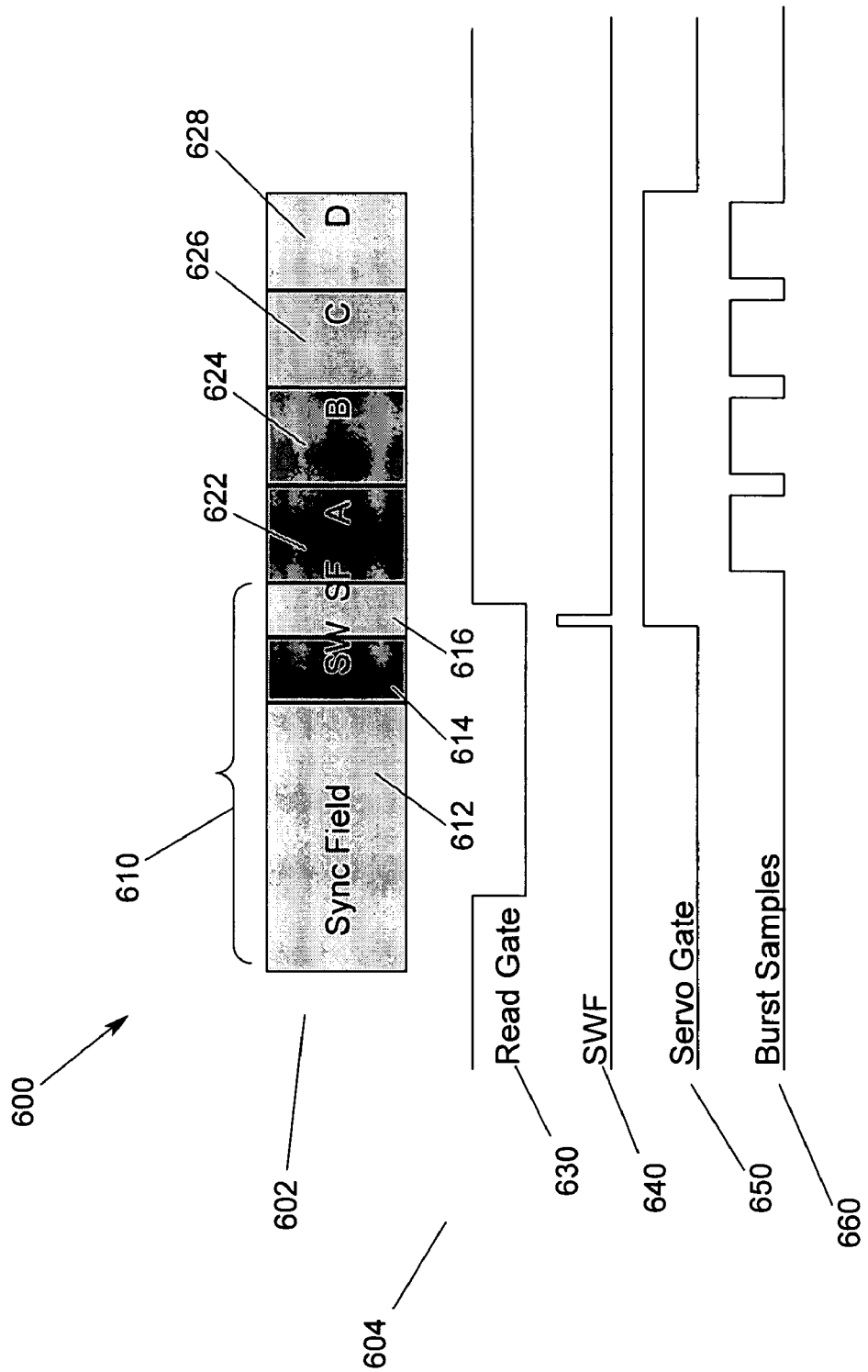
FIG. 6 illustrates a combined multislot timing/radial pattern according to the present invention.

FIG. 6 illustrates a combined multislot timing/radial pattern 600 according to the present invention. By combining the timing and radial patterns into one pattern, the overall servo writing process is simplified and the amount of disk space necessary to provide the timing and radial information is reduced.

The reduction in the overhead associated with the timing and radial pattern length should allow for writing more sectors in a single revolution then currently possible. In the future, the number of servo patterns on each track is predicted to increase. As the number of servo patterns that are required for each track increases, the time between servo patterns reduces during the servo write process.

The multislot timing pattern was developed to allow for a long pattern that spans the write-to-read separation of the head. The radial bursts slots are chosen to avoid writing a burst at the same time a burst needs to be read. A radial bursts having a long length was previously needed because of the lack of good timing information to make sure the radial pattern bursts were demodulated correctly. When the radial burst pattern is combined with the multislot timing pattern, both of these problems are solved. The combined multislot timing/radial pattern 600 eliminates the complexity involved in laying out the radial bursts thus reducing the number of required radial burst slots. The length of the bursts can be greatly reduced by using the detection of a timing mark as a reference for the burst demodulation. In this way the timing for the radial demodulation is updated on every sector instead of just once per revolution.

The combined multislot timing/radial pattern 600 includes the original timing pattern 610, which includes a sync field 612 and sync word pattern 614. The sync word pattern 614 is followed by a short sync field 616 to allow for internal delays in the channel to detect the sync word 614. The secondary sync field 616 is followed by several radial bursts 622, 624, 626, 628. In FIG. 6, there are four radial bursts 622, 624, 626, 628. The number of bursts could change depending on the step size used in servo writing.

Shown below the pattern field representation 602 are some timing signals 604 associated with using the data channel. The first timing signal is the read gate 630, which must be active in order for the data channel to detect the timing pattern. The signal labeled SWF is the Sync Word Found signal 640, which is generated by the data channel when the sync mark is detected. The SWF signal 640 becomes the timing reference for the radial bursts demodulation. The Servo Gate 650 goes active when the SWF signal 640 goes active. This would switch the data channel from read mode to servo mode. The Burst Samples signal 660 is an internal signal in the data channel, which gates the area of the bursts that will be demodulated. The timing of the Burst Samples signal 660 is controlled by internal registers in the data channel.

Figure 7:
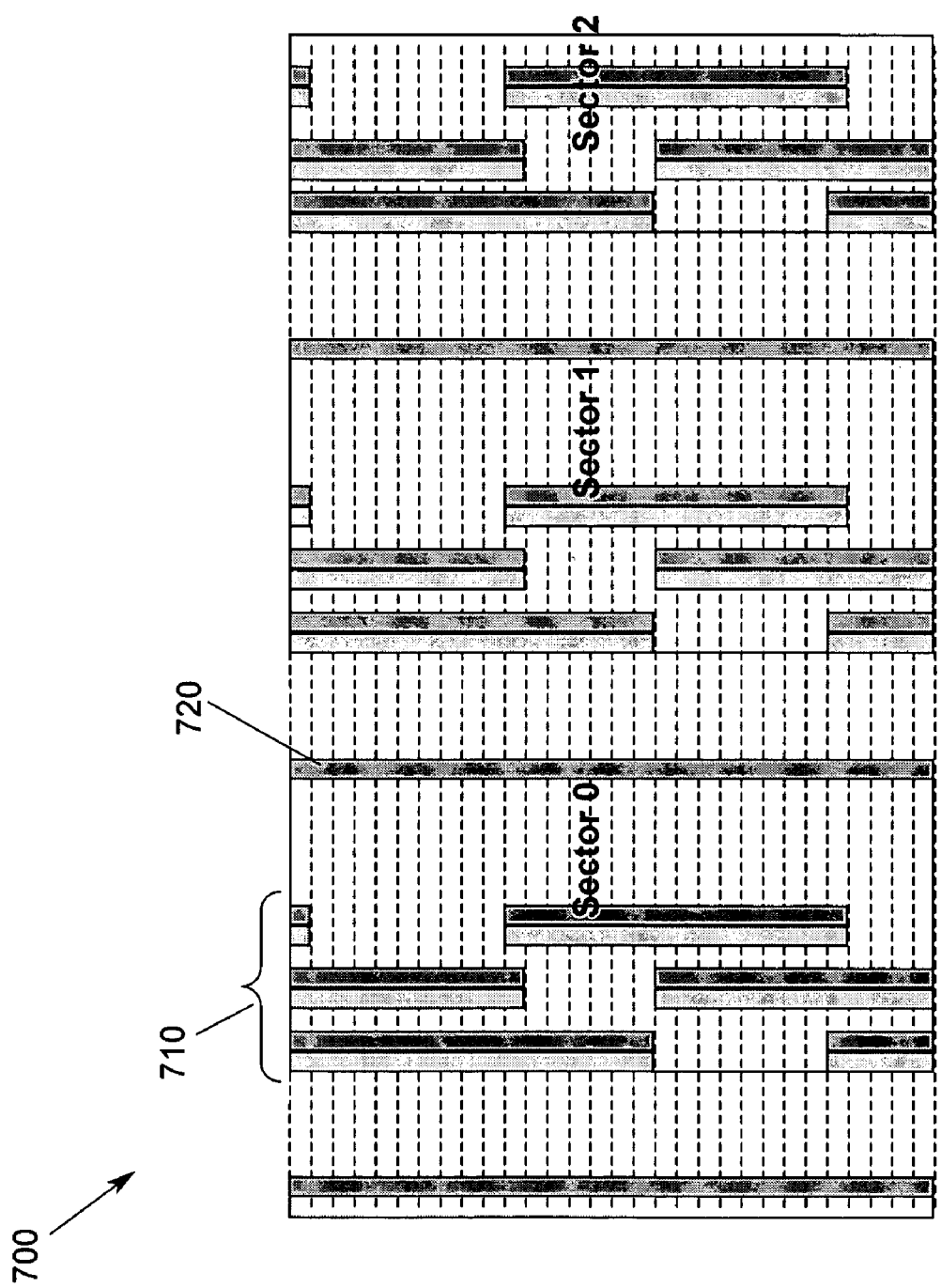
FIG. 7 illustrates a layout of the combined multislot timing/radial pattern according to an embodiment of the present invention.

FIG. 7 illustrates a layout 700 of the combined multislot timing/radial pattern according to an embodiment of the present invention. In FIG. 7, multislot timing/radial pattern 710 and the product servo pattern 720 are shown. A number of servo tracks to be written before switching to the next slot may be determined. The numbers of tracks is dependant on the width of the write head, the physical offset of the read and write elements of the head, and the step size. This switching point must be adjusted for the combined multislot timing/radial pattern 700 according to an embodiment of the present invention.

Figure 8:
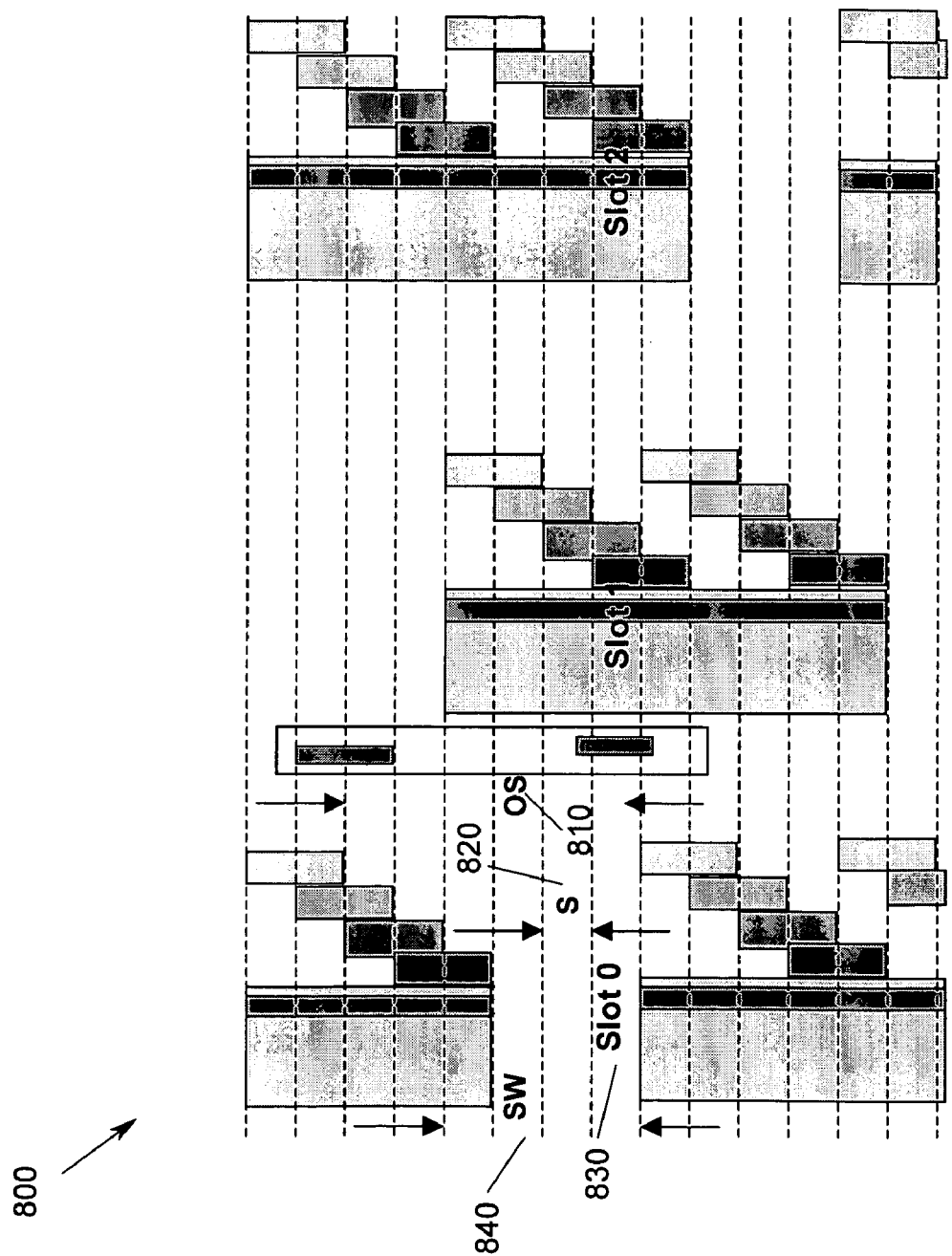
FIG. 8 illustrates a more detailed layout of the combined multislot timing/radial pattern with OS=5.5 S according to an embodiment of the present invention.

FIG. 8 illustrates a more detailed layout of the combined multislot timing/radial pattern with OS=5.5 S 800 according to an embodiment of the present invention. In FIG. 8, a head with a read-to-write offset labeled OS 810 and the track step size is labeled S 820 is shown. The number of tracks written in each slot 830 is referred to as SW 840. The equation to calculate how many tracks can be written in each slot is:

$$SW = \text{Integer part of } (OS-S)/S.$$

For the head depicted in FIG. 8 with RW=5.5 tracks, the number of tracks written using each slot is:

$$SW = \text{Integer part of } (5.5S-S)/S = 4.$$

For this head at this position, the slot that is being read will be switched after every 4 tracks. As the self-servo write process continues the read-to-write offset, RW, will change and the number of tracks read in each slot, SW, will also have to change.

Figure 9:
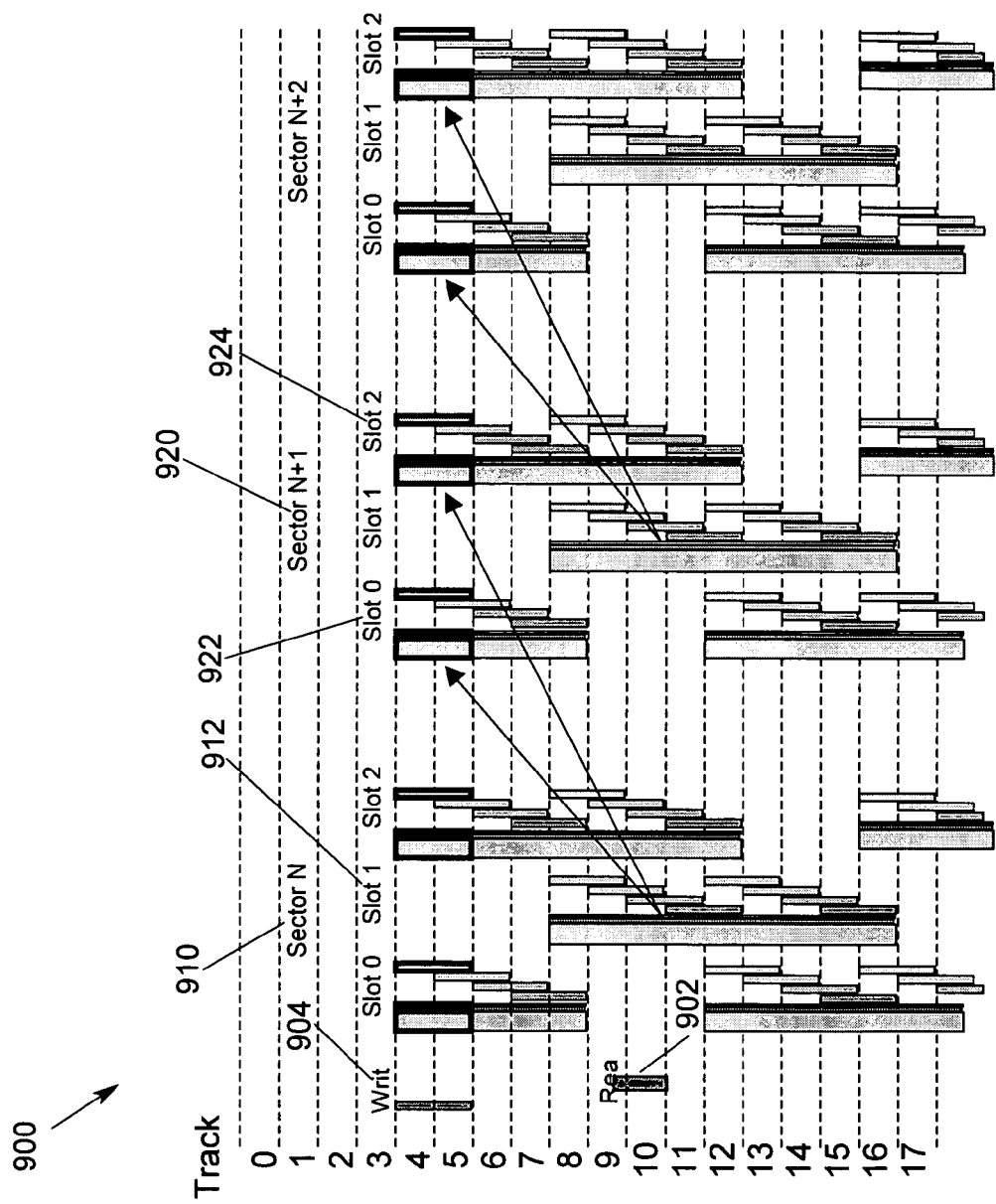
FIG. 9 illustrates patterns when reading slot 1 and writing slots 0 and 2 according to an embodiment of the present invention.

Next, a demonstration of how the propagation of the combined multislot timing/radial pattern will be described. FIG. 9 illustrates patterns 900 when reading slot 1 and writing slots 0 and 2 according to an embodiment of the present invention. In FIG. 9, the read head 902 is over track 10 and the write head 904 is over track 4 and track 5. Further, in FIG. 9, slot 1 912 of sector N 910 is being read to acquire timing and radial feedback and the propagation pattern is being written in slots 0 922 and 2 924 of sector N+1 920.

Figure 10:
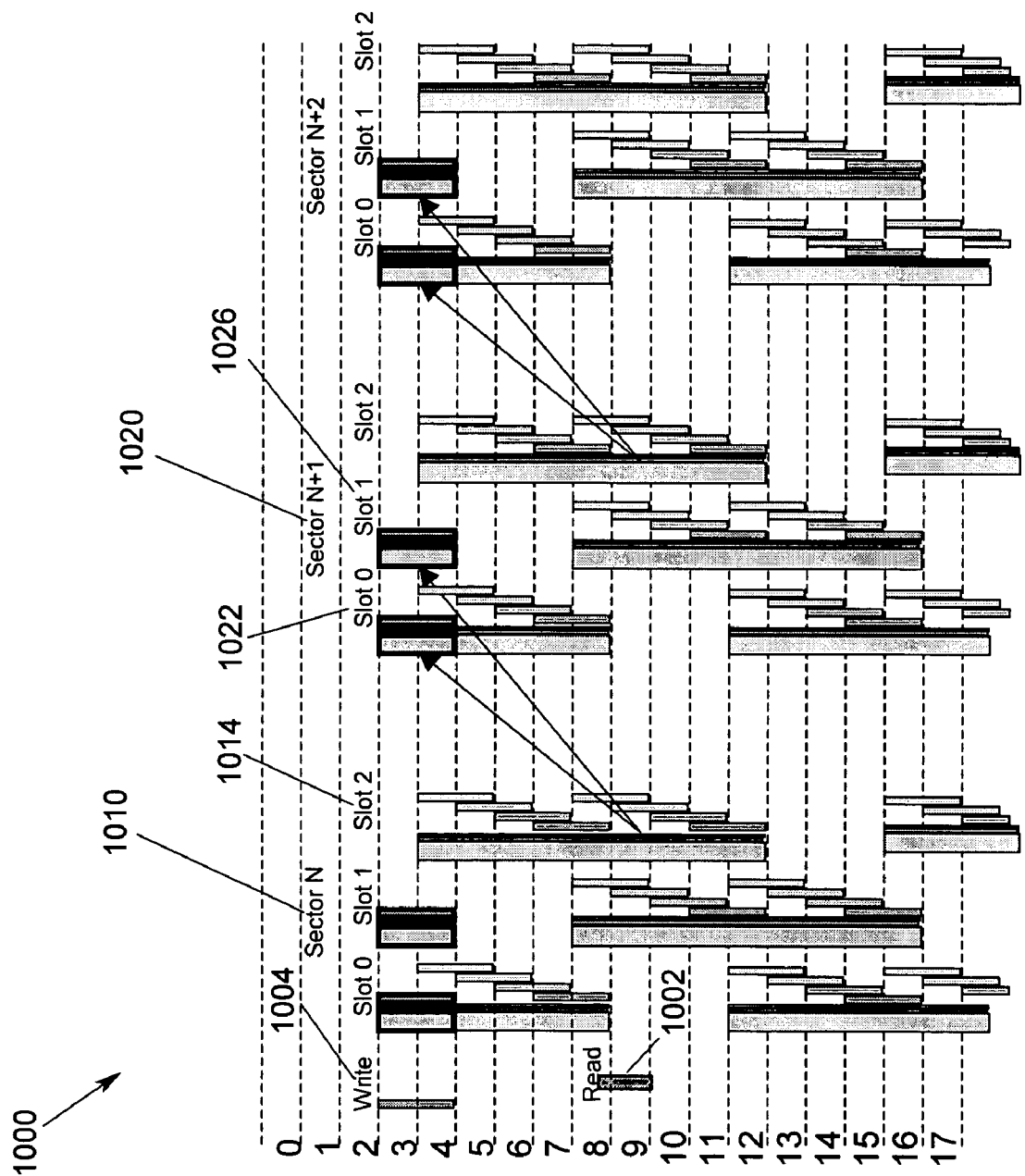
FIG. 10 illustrates patterns when reading slot 2 and writing slots 0 and 1 according to an embodiment of the present invention.

FIG. 10 illustrates patterns 1000 when reading slot 2 and writing slots 0 and 1 according to an embodiment of the present invention. In FIG. 10, the read head 1002 is over track 9 and the write head 1004 is over track 3 and track 4. In FIG. 10, as the read head is moved to the next track, i.e. track 9, it is necessary to switch to reading slot 2 1014 in sector N 1010 while writing the propagation patterns in slots 0 1022 and 1 1026 of sector N+1 1020.

This process continues until the entire surface has been servo written. For simplicity the actual product servo pattern is not being shown in FIGS. 8–10, but would be written in each of the servo sectors. When the reference slot is chosen based on the formula detailed above, the proper timing offset for the writing of the product pattern must also be adjusted accordingly.

Figure 11:
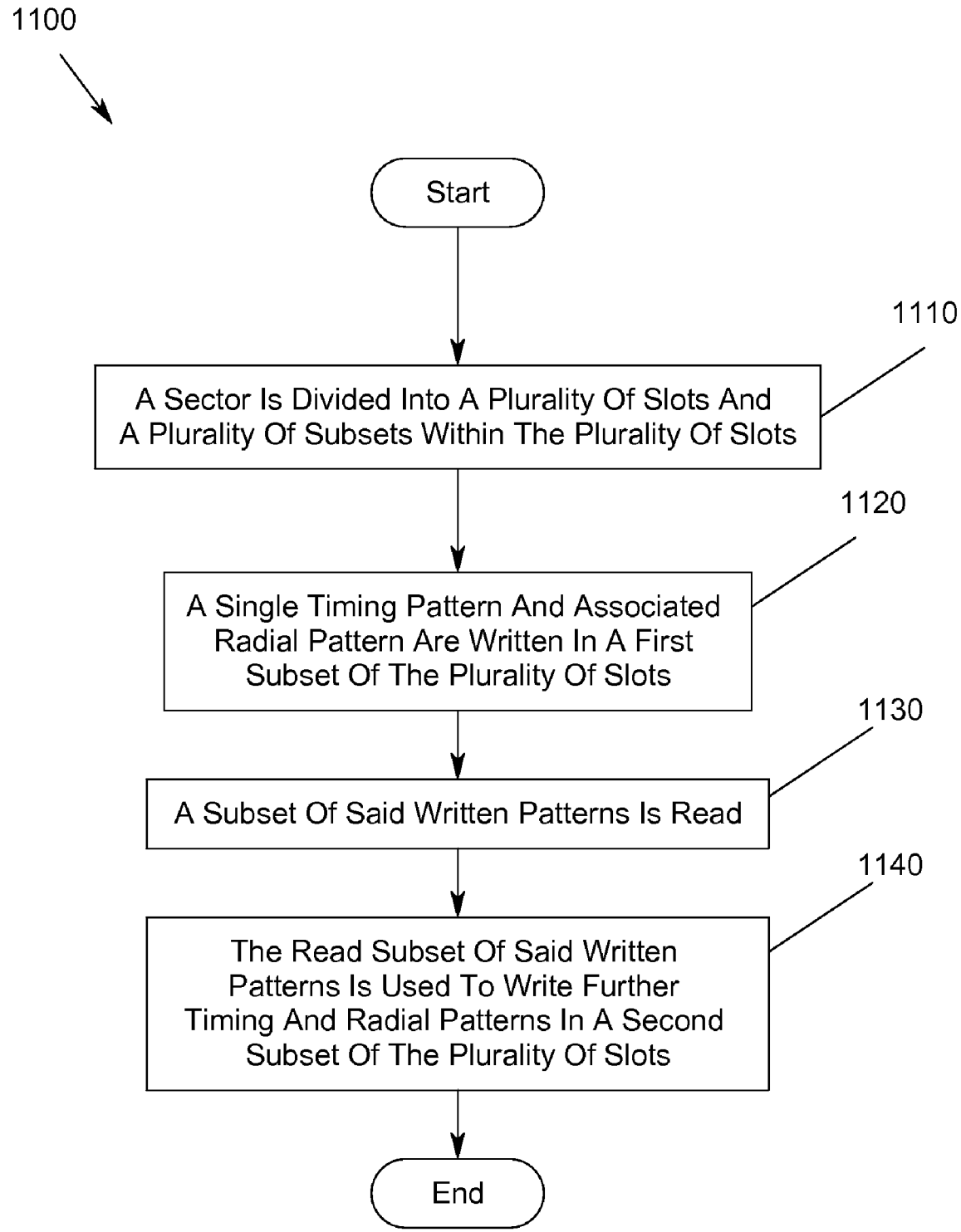
FIG. 11 is a flowchart of the method for providing combined radial and timing multislot self-servowrite propagation according to an embodiment of the present invention.

FIG. 11 is a flowchart 1100 of the method for providing combined radial and timing multislot self-servowrite propagation according to an embodiment of the present invention. A sector is divided into a plurality of slots and a plurality of subsets of the plurality of slots 1110. A single timing pattern and associated radial pattern are written in a first subset of the plurality of slots 1120. A subset of said written patterns is read 1130. The read subset of said written patterns are used to write further timing and radial patterns in a second subset of the plurality of slots 1140.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing combined radial and timing multislot self-servowrite propagation for a magnetic disk drive, comprising:

providing a plurality of slots for each sector on a storage medium, a plurality of slot subsets being formed using a plurality of slots from a sector, writing timing pattern information and radial pattern information within a first slot subset of a plurality of slots of a sector at a plurality of adjacent radial locations;

reading at least a portion of said written pattern information at a radial location; and using the read of said written patterns to write further timing and radial patterns in a second slot subset of a plurality of slots of a sector.

2. The method of claim 1, wherein the reading at least a portion of said written pattern information at a radial location further comprises reading a first slot in a first sector to acquire timing and radial feedback and the using the read of said written patterns to write further timing and radial patterns in a second slot subset of a plurality of slots of a sector further comprises writing propagation pattern in a second and third slot in a second sector.

3. The method of claim 2, wherein the reading a first slot in a first sector to acquire timing and radial feedback and writing propagation pattern in a second and third slot in a second sector further comprises reading slot B in sector X to acquire timing and radial feedback and writing propagation pattern in slot A and slot C in sector X+1.

4. The method of claim 1, wherein the writing timing pattern information and radial pattern information further comprises writing radial patterns in a fixed number of slots per sector.

5. The method of claim 1, wherein the writing of the radial pattern information is chosen to avoid writing pattern information at the same time pattern information needs to be read.

6. The method of claim 1 further comprising switching the subset of slots to read and the subset of slots to write, where said switching is performed at desired track locations.

7. The method of claim 6, wherein said desired track locations are determined based on read-to-write offset and servo track step size.

8. The method of claim 6, wherein the writing of the timing pattern information and radial pattern information within a first slot subset of a plurality of slots of a sector at a plurality of adjacent radial locations form a combined timing/radial pattern, the writing further comprising determining a number of tracks for which the same subset of slots is to be written, N, based on the read-to-write offset and the servo track step size.

9. The method of claim 1 further comprises reading one or more slots while writing at least two slots during the same revolution.

10. The method of claim 1, wherein the writing of the timing pattern information and radial pattern information of the plurality of slots for a sector is performed using electronics of the magnetic disk drive.

11. The method of claim 1, wherein the writing of the single timing pattern information and associated radial pattern information in each of the plurality of slots for a sector is performed using an external servo writing device.

12. A magnetic storage system, comprising:

at least one magnetic storage medium;

a motor for translating the magnetic storage medium;

at least one magnetic transducer for reading and writing data on the at least one magnetic storage medium;

an actuator, coupled to the at least one magnetic transducer, for moving the at least one magnetic transducer relative to the at least one magnetic storage medium;

and a read/write channel, coupled to the at least one magnetic transducer, for processing data read and written on the at least one magnetic storage medium, wherein the processor is configured for providing combined radial and timing multislot self-servowrite propagation by providing a plurality of slots for each sector on a storage medium, a plurality of slot subsets being formed using a plurality of slots from a sector, writing timing pattern information and radial pattern information within a first slot subset of a plurality of slots of a sector at a plurality of adjacent radial locations, reading at least a portion of said written pattern information at a radial location and using the read of said written patterns to write further timing and radial patterns in a second slot subset of a plurality of slots of a sector.

13. The magnetic storage system of claim 12, wherein the processor is further configured to read a first slot in a first sector to acquire timing and radial feedback and to write propagation pattern in a second and third slot in a second sector.

14. The magnetic storage system of claim 13, wherein the processor is further configured to read slot B in sector X to acquire timing and radial feedback and to write propagation information in slot A and slot C in sector X+1.

15. The magnetic storage system of claim 12, wherein the processor is further configured to write radial patterns in a fixed number of slots per sector.

16. The magnetic storage system of claim 12, wherein the processor is further configured to avoid writing pattern information at the same time pattern information needs to be read.

17. The magnetic storage system of claim 12, wherein the processor is further configured to switch the subset of slots to read and the subset of slots to write, where said switching is done at desired track locations.

18. The magnetic storage system of claim 12, wherein the processor is further configured to determine said desired track locations based on read-to-write offset and servo track step size.

19. The magnetic storage system of claim 18, wherein the processor is further configured to write the single timing pattern information and radial pattern information within a first slot subset of a plurality of slots of a sector at a plurality of adjacent radial locations by determining a number of tracks for the same subset of slots is to be written, N, based on the read-to-write offset and the track step size.

20. The magnetic storage system of claim 12, wherein the processor is further configured to read one or more slots while writing at least two slots during the same revolution.

21. The magnetic storage system of claim 12, wherein the processor is further configured to write the timing pattern information and radial pattern information of the plurality of slots for a sector is performed using electronics of the magnetic disk drive.

22. The magnetic storage system of claim 12, wherein the processor is further configured to write the single timing pattern information and associated radial pattern information in each of the plurality of slots for a sector using an external servo writing device.

* * * * *